United States Patent [19] … [11] Patent Number: 5,007,710
Nakajima et al. … [45] Date of Patent: Apr. 16, 1991

[54] MULTI-LAYERED SURFACE REFLECTING MIRROR

[75] Inventors: Yuji Nakajima, Suginami; Masashi Mochizuki, Hoya, both of Japan

[73] Assignee: Hoya Corporation, Tokyo, Japan

[21] Appl. No.: 425,119

[22] Filed: Oct. 23, 1989

[30] Foreign Application Priority Data

Oct. 31, 1988 [JP] Japan ................... 63-275097

[51] Int. Cl.[5] ............ G02B 5/08; G02B 5/28
[52] U.S. Cl. ................... 350/166; 350/278; 350/642; 350/164
[58] Field of Search ........... 350/164, 166, 163, 600, 350/642, 278, 311; 428/912.2

[56] References Cited

U.S. PATENT DOCUMENTS 3,033,701  5/1962  Wozniak ................ 350/166
3,679,291  7/1972  Apfel et al. ............. 350/164
4,673,248  6/1987  Taguchi et al. .......... 350/166
4,805,989  2/1989  Nakajima ................ 350/164
4,856,019  8/1989  Miyata et al. .......... 350/164 X

FOREIGN PATENT DOCUMENTS 0028487  3/1981  Japan ................... 350/164
0162702  12/1981 Japan ................... 350/642
0015604  1/1985  Japan ................... 350/642
0165805  7/1988  Japan .

OTHER PUBLICATIONS

Reale, Carlo, "Reflectance of Metallic Films Coated with Dielectric Layers", Manufacturing Optician International, vol. 22, No. 1, Jul. 1969, pp. 9, 11–13.

Primary Examiner—Bruce Y. Arnold
Assistant Examiner—David R. Parsons
Attorney, Agent, or Firm—Nixon & Vanderhye

[57] ABSTRACT

A multi-layered surface reflecting mirror comprises a substrate, a metal or semiconductor film formed on one side of the substrate and a dielectric multi-layered film formed on the metal or semiconductor film. The dielectric multi-layered film consisting of a low refractive index material layer having an optical thickness of $0.05\lambda_o$ ($\lambda_o/20$)–$0.4\lambda_o$ ($2/5\lambda_o$) ($\lambda_o$ is the wavelength of a light used as the reference measurement for design purposes) and a high refractive index material layer having an optical thickness of $\lambda_o/2$. The low refractive index material layer existing closer to the metal or semiconductor film relative to the high refractive index material layer, and the high refractive index material layer existing closer to the atmosphere relative to the low refractive index material layer. The multi-layered surface reflecting mirror is used mainly as a rearview mirror for automobiles, a mirror with a convex surface that warns drivers against hazards on the road, an ornamental mirror, etc.

10 Claims, 11 Drawing Sheets

MULTI-LAYERED SURFACE REFLECTING MIRROR

BACKGROUND OF THE INVENTION

(1) Field of the Invention

The present invention relates to a reflecting mirror and more particularly to a multi-layered surface reflecting mirror superior in freedom from glare, visibility, decorative aspect, productivity, cost, etc. The multi-layered surface reflecting mirror of the present invention is used mainly as a rearview mirror for automobiles, a mirror with a convex surface that warns drivers against hazards on the road, an ornamental mirror, etc. and further has other wide applications.

(2) Description of the Prior Art

As an example of the multi-layered surface reflecting mirror, Japanese Patent Application Kokai (Laid-Open) No. 165805/1988 discloses a multi layered surface reflecting mirror comprising a glass substrate, a dielectric multi-layered film formed on one side of the substrate and a light-absorbing film formed on the back side of the substrate wherein the dielectric multi-layered film is constituted by laminating three to six (3 to 6) dielectric layers having alternately differing refractive indexes and at least one of the three to six dielectric layers has an optical thickness of $\lambda/2$.

FIG. 8 shows the spectral luminous efficiency $V'(\lambda)$ for dark adaptation of the human eye [curve (1)] the spectral energy characteristic $P(\lambda)$ of an automobile headlight (halogen lamp) [straight line (2)] and their product $P(\lambda) \times V'(\lambda)$ [curve (3)]. As is clear from FIG. 8, the wavelength portion sensible by the human eye, of a light emitted at night from the headlight (halogen lamp) of an automobile running behind, lies mainly in a wavelength region of 480–550 nm. Accordingly, in order for a reflecting mirror to have a glareless property, it is necessary that the mirror have a low reflectance at said wavelength region.

The multi-layered surface reflecting mirror disclosed in said patent document has a low reflectance at a wavelength region of 480–580 nm and accordingly has an excellent glareless property, as understood from its spectral reflection characteristic shown in FIG. 9. This reflecting mirror has a low reflectance in the wavelength region where the glareless property is required and a high reflectance in other wavelength regions; therefore, the reflecting mirror has excellent visibility, too.

In the multi-layered surface reflecting mirror disclosed in said patent document, however, a number of (three to six) dielectric layers are provided on one side of a glass substrate for the formation of a dielectric multi-layered film, thus making complex the vapor deposition step required for the formation of said film; moreover, it is necessary to form a light-absorbing film on the other side of the substrate by coating and baking, in a step separate from said deposition step, thus inviting low productivity and a high cost.

SUMMARY OF THE INVENTION

A general object of the present invention is to solve the above mentioned problems of the conventional multi-layered surface reflecting mirrors. A definite object of the present invention is to provide a multi-layered surface reflecting mirror superior in freedom from glare, visibility, productivity, cost, etc.

According to the present invention, there is provided a multi-layered surface reflecting mirror comprising a substrate, a metal or semiconductor film formed on one side of the substrate and a dielectric multi layered film formed on the metal or semiconductor film, said dielectric multi-layered film consisting of a low refractive index material layer having an optical thickness of $0.05\lambda o$ ($\lambda o/20$) to $0.4\lambda o$ ($2/5\lambda o$) ($\lambda o$ is the wavelength of a light used as the reference measurement for design purposes) and a high refractive index material layer having an optical thickness of $\lambda o/2$, said low refractive index material layer existing closer to the metal or semiconductor film relative to said high refractive index material layer, and said high refractive index material layer existing closer to the atmosphere relative to said low refractive index material layer.

DETAILED DESCRIPTION OF THE INVENTION

Figure 1A:
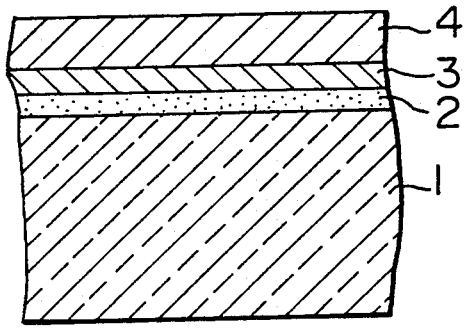
FIGS. 1(A)–1(F) each show on an enlarged scale the sectional views of the essential part of a multi-layered surface reflecting mirror of the present invention.
Figure 1D:
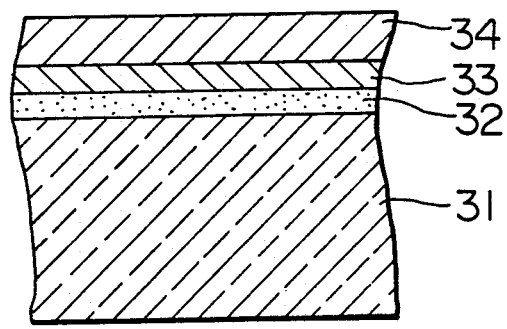
Figure 1B:
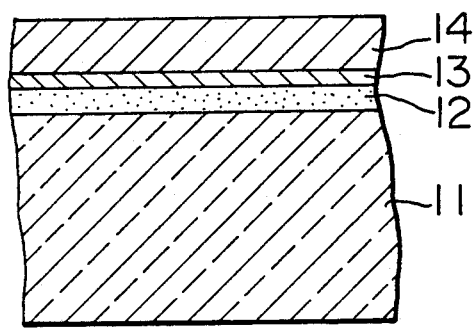
Figure 1E:
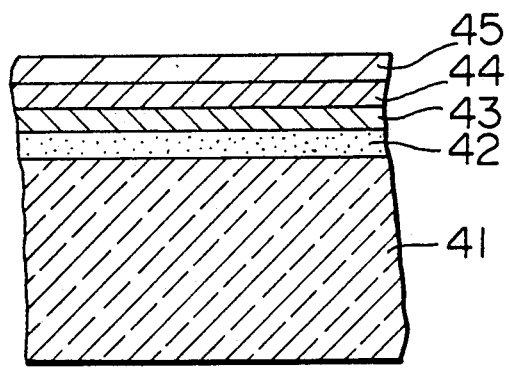
Figure 1C:
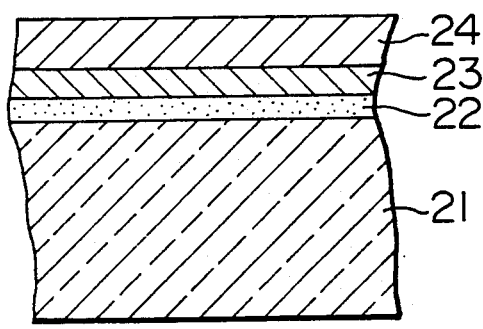
Figure 1F:
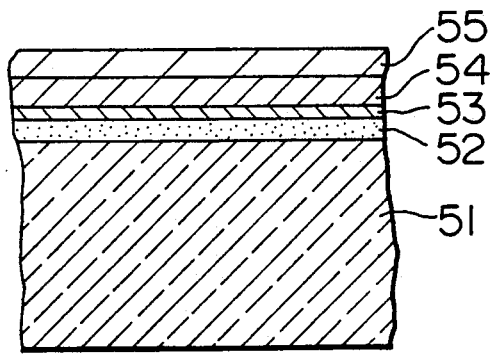

The present invention is described in detail below.

The substrate used in the multi-layered surface reflecting mirror of the present invention is preferably a transparent substrate but may be a non-transparent substrate. The substrate preferably has a plane at both sides or a convex or concave surface at least at one side (e.g. a plano-concave plate, a plano-convex plate, a concave-convex plate, a double-concave plate, a double-convex plate). As the preferable material of the substrate, there are mentioned glass and plastics, but other materials can be used as well.

In the multi-layered surface reflecting mirror of the present invention, there are provided, on one side of the substrate, a metal or semiconductor film and, on this film, a dielectric multi-layered film.

Hence, description is made firstly of the metal or semiconductor film formed on one side of the substrate.

The metal or semiconductor film functions as a reflecting film and has a reflectance of preferably 30% or more particularly preferably 50–80%. As such a metal or semiconductor film, there is used a single metal or semiconductor such as Cr, Ni, Al, Ag, Co, Fe, Si, Ge or the like, or an alloy containing at least one of these metals and/or semiconductors. Examples of the alloy include INCONEL, an alloy of nickel, chromium and iron (consisting mainly of 80% by weight of Ni, 14% by weight of Cr and 6% by weight of Fe and, besides, containing a very small amount of impurities) and CHROMEL, an allow of chromium (consisting mainly of 80% by weight of Ni and 20% by weight of Cr and, besides, containing a very small amount of impurities).

The metal or semiconductor film can be formed by the same coating methods (e.g. evaporation, sputtering, ion plating, chemical vapor deposition (CVD)) as used in the formation of the dielectric multi-layered film which is described later.

Next, there is described the dielectric multi-layered film formed on the metal or semiconductor film. The dielectric multi-layered film consists of a low refractive index material layer and a high refractive index material layer The low refractive index material layer is preferably made of a low refractive index material having a refractive index of 1.3-1.5. As such a low refractive index material there is appropriately used a silicon oxide such as $SiO_2$ or the like a metal fluoride such as $MgF_2$ or the like, or a mixture thereof. The high refractive index material layer is preferably made of a high refractive index material having a refractive index of 1.5-2.4. As such a high refractive index material there is appropriately used a silicon or metal oxide such as SiO, $TiO_2$, $Ta_2O_5$, $ZrO_2$, $HfO_2$, $Al_2O_3$ or the like, a metal fluoride such as $CeF_3$ or the like, a metal sulfide such as ZnS or the like, or a mixture thereof.

The optical thickness of the low refractive index material layer is restricted to $0.05\lambda o$ ($\lambda o/20$)–$0.4\lambda o$ ($2/5\lambda o$) ($\lambda o$ is the wavelength of a light used as the reference measurement for design purposes). Meanwhile, the optical thickness of the high refractive index material layer is restricted to $\lambda o/2$. The reason for the restriction of the optical thicknesses of the two layers to the above ranges is that the restriction allows the resulting reflecting mirror to have a reflection characteristic giving excellent glare prevention and excellent visibility. The optical thickness of the low refractive index material layer is particularly preferably $\lambda o/8$ or $\lambda o/4$.

It is possible to form a high refractive index material layer having an optical thickness of $\lambda o/2$ by combining a high refractive index material layer having an optical thickness of $\lambda o/4$ and another high refractive index material layer having an optical thickness of $\lambda o/4$, said two high refractive index material layers being provided adjacent to each other.

In the dielectric multi-layered film constituting the multi-layered surface reflecting mirror of the present invention, the relative positions of the low refractive index material layer and the high refractive index material layer are specified. That is, the low refractive index material layer is provided closer to the metal or semiconductor film and the high refractive index material layer is provided closer to the atmosphere. The reason for specifying the relative positions of the two layers is that such specification allows the resulting reflecting mirror to have a reflection characteristic giving excellent glare prevention and excellent visibility.

The dielectric multi-layered film can be formed by various coating methods including physical coating techniques such as evaporation, sputtering and ion plating, chemical vapor desposition (CVD) techniques; and thin-film forming techniques such as one employing an organic coating solution.

Preferred embodiments of the present invention are described below by way of Examples. However, the present invention is in no way restricted by these Examples.

Example 1

Figure 2:
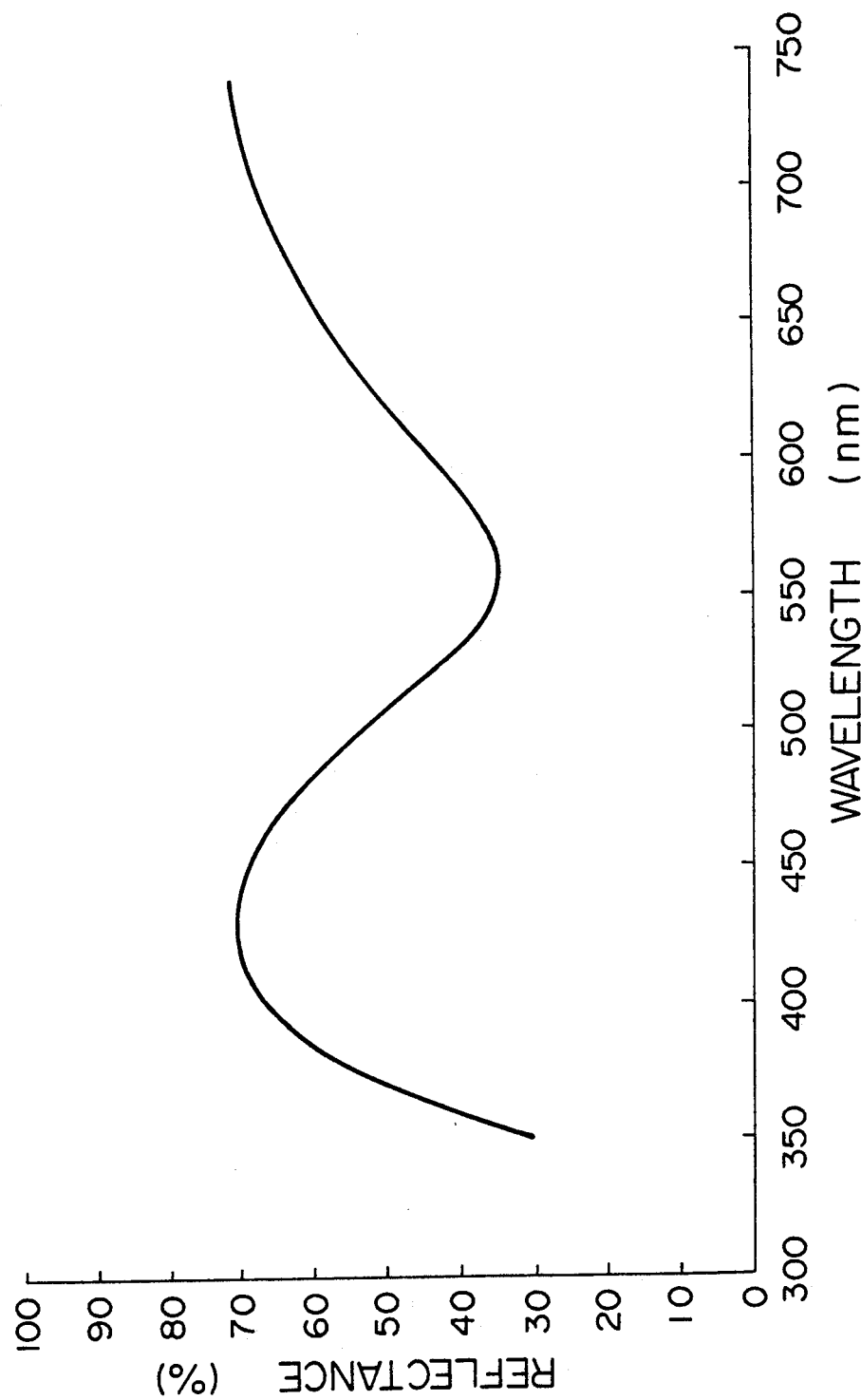
FIGS. 2, 3, 4, 5, 6 and 7 each show the spectral reflection characteristics of a multi-layered surface reflecting mirror of the present invention.

FIG. 1 (A) shows on an enlarged scale a sectional view of the essential part of a multi-layered surface reflecting mirror of the present invention. In FIG. 1 (A), numeral 1 is a glass substrate; numeral 2 is a Cr film; numeral 3 is a low refractive index material layer (a L layer) made of $MgF_2$ having a refractive index of 1.38, said layer having an optical thickness of $\lambda o/4$ (in this Example, $\lambda o$ (the wavelength of a light used as the reference measurement for design purposes) is 540 nm and accordingly $\lambda o/4$ is 135 nm); and numeral 4 is a high refractive index material layer (a 2H layer) made of $ZrO_2$ having a refractive index of 2.05, said layer having an optical thickness of $\lambda o/2$ (270 nm). That is, in the multi-layered surface reflecting mirror of this Example, there is formed, on one side of the glass substrate, a multi-layered film consisting of the Cr film, the L layer and the 2H layer in this order, with the Cr film being closest to the glass substrate. The optical reflection characteristic of the multi-layered surface reflecting mirror is shown in FIG. 2. As is clear from FIG. 2, the multi-layered surface reflecting mirror of this Example, as compared with the conventional multi-layered surface reflecting mirrors, is superior in freedom from glare because it has a low reflectance at a wavelength region of 480-580 nm which substantially agrees with 480-550 nm where the product of the spectral luminous efficiency for dark adaptation of the human eye and the spectral energy characteristic of an automobile headlight is high, and is superior in visibility because it has high refletances at blue (400-480 nm) and red (580-700 nm) wavelength regions where the sensitivity of the human eye is low in terms of brightness.

Example 2

FIG. 1 (B) shows on an enlarged scale a sectional view of the essential part of another multi-layered surface reflecting mirror of the present invention. In FIG. 1 (B), numeral 11 is a glass substrate; numeral 12 is a Cr film; numeral 13 is a low refractive index material layer (a L/2 layer) made of $MgF_2$ having a refractive index of 1.38, said layer having an optical thickness of $\lambda o/8$ (in this Example, $\lambda o$ (the wavelength of a light used as the reference measurement for design purposes) is 600 nm and accordingly $\lambda o/8$ is 75 nm); and numeral 14 is a high refractive index material layer (a 2H layer) made of $ZrO_2$ having a refractive index of 2.05, said layer having an optical thickness of $\lambda o/2$ (300 nm). That is, in the multi-layered surface reflecting mirror of this Example, there is formed, on one side of the glass substrate, a multi-layered film consisting of the Cr film, the L/2 layer and the 2H layer in this order, with the Cr film being closest to the substrate.

Figure 3:
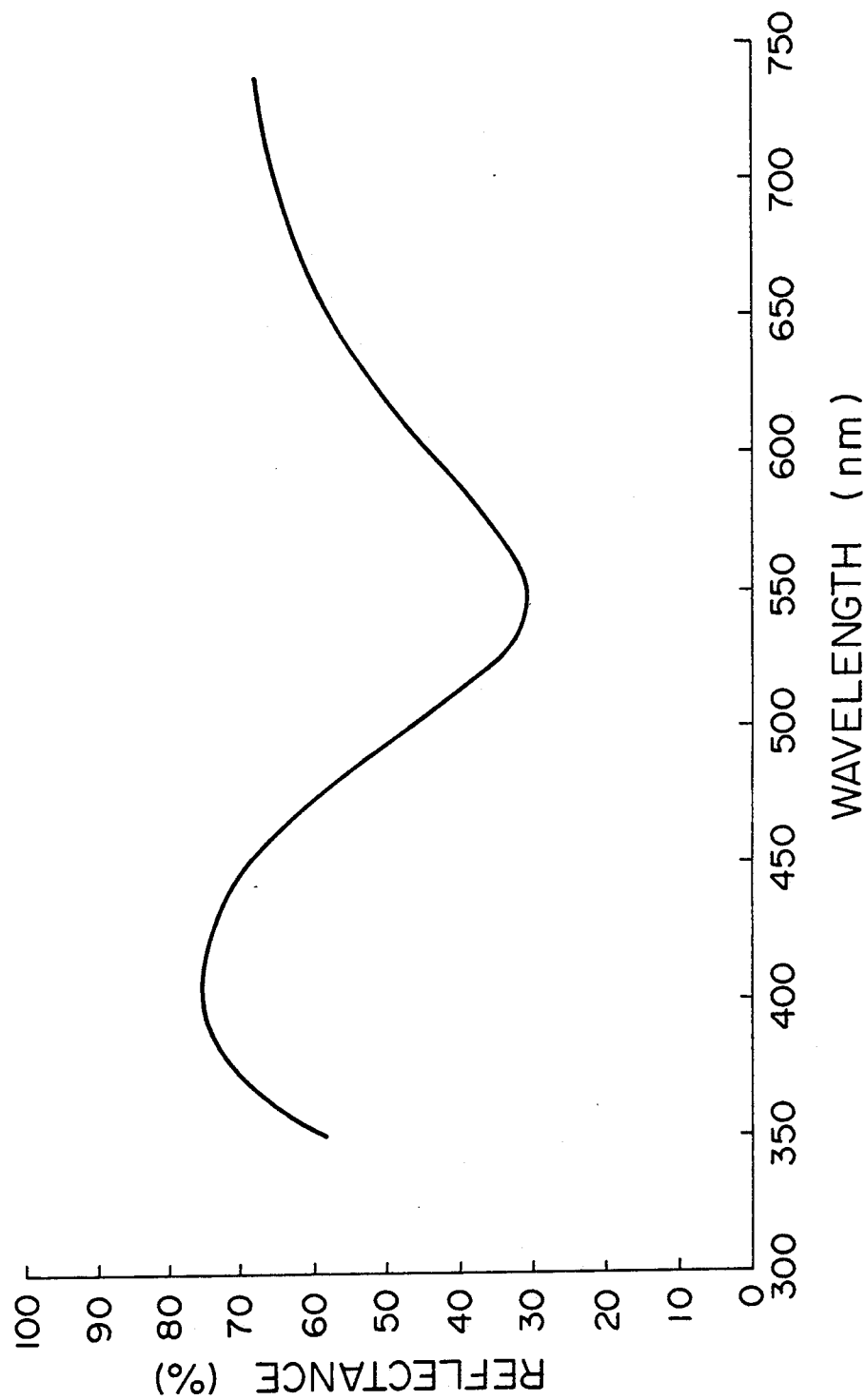

As is clear from FIG. 3, the multi-layered surface reflecting mirror of this Example shows a spectral reflection characteristic similar to that of the multi-layered surface reflecting mirror of Example 1 and accordingly is superior in freedom from glare and visibility.

Example 3

FIG. 1 (C) shows on an enlarged scale a sectional view of the essential part of another multi-layered surface reflecting mirror of the present invention. In FIG. 1 (C), numeral 21 is a glass substrate; numeral 22 is a Cr film; numeral 23 is a low refractive index material layer (a L layer) made of MgF$_2$ having a refractive index of 1.38, said layer having an optical thickness of $\lambda$o/4 (in this Example, $\lambda$o (the wavelength of a light used as the reference measurement for design purposes) is 540 nm and accordingly $\lambda$o/4 is 135 nm); and numeral 24 is a high refractive index material layer (a 2H layer) made of Al$_2$O$_3$ having a refractive index of 1.63, said layer having an optical thickness of $\lambda$o/2 (270 nm). That is, in the multi-layered surface reflecting mirror of this Example, there is formed, on one side of the glass substrate, a multi-layered film consisting of the Cr film, the L layer and the 2H layer in this order, with the Cr film being closest to the substrate.

Figure 4:
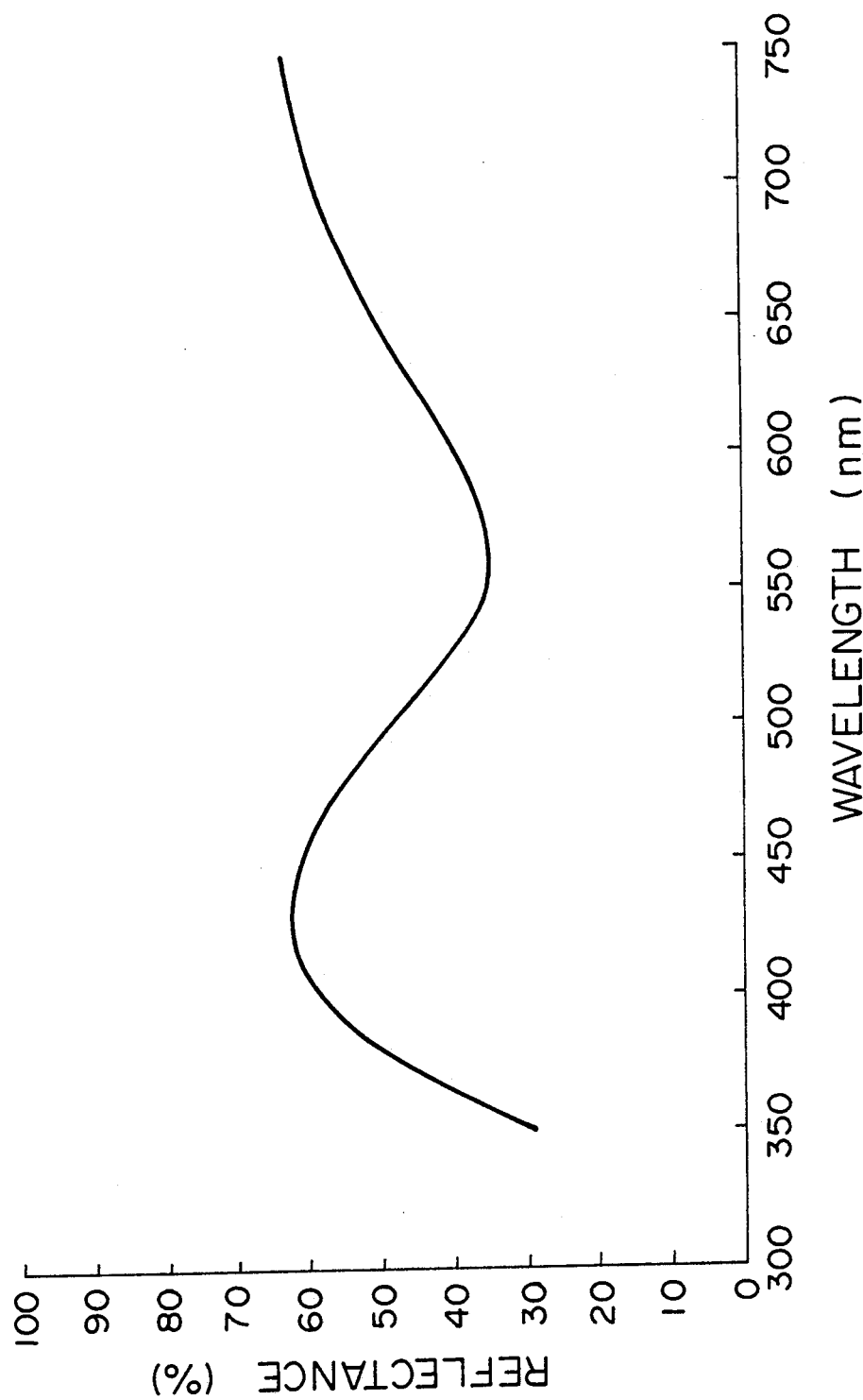

As is clear from FIG. 4, the multi-layered surface reflecting mirror of this Example shows a spectral reflection characteristic similar to that of the multi-layered surface reflecting mirror of Example 1 and accordingly is superior in freedom from glare and visibility.

Example 4

FIG. 1 (D) shows on an enlarged scale a sectional view of the esential part of another multi-layered surface reflecting mirror of the present invention. In FIG. 1 (D), numeral 31 is a glass substrate; numeral 32 is a Ge film; numeral 33 is a low refractive index material layer (a L layer) made of MgF$_2$ having a refractive index of 1.38, said layer having an optical thickness of $\lambda$o/4 (in this Example, $\lambda$o (the wavelength of a light used as the reference measurement for design purposes) is 540 nm and accordingly $\lambda$o/4 is 135 nm); and numeral 34 is a high refractive index material layer (a 2H layer) made of ZrO$_2$ having a refractive index of 2.05, said layer having an optical thickness of $\lambda$o/2 (270 nm). That is, in the multi-layered surface reflecting mirror of this Example, there is formed, on one side of the glass substrate, a multi-layered film consisting of the Ge film, the L layer and the 2H layer in this order, with the Ge film being closest to the substrate.

Figure 5:
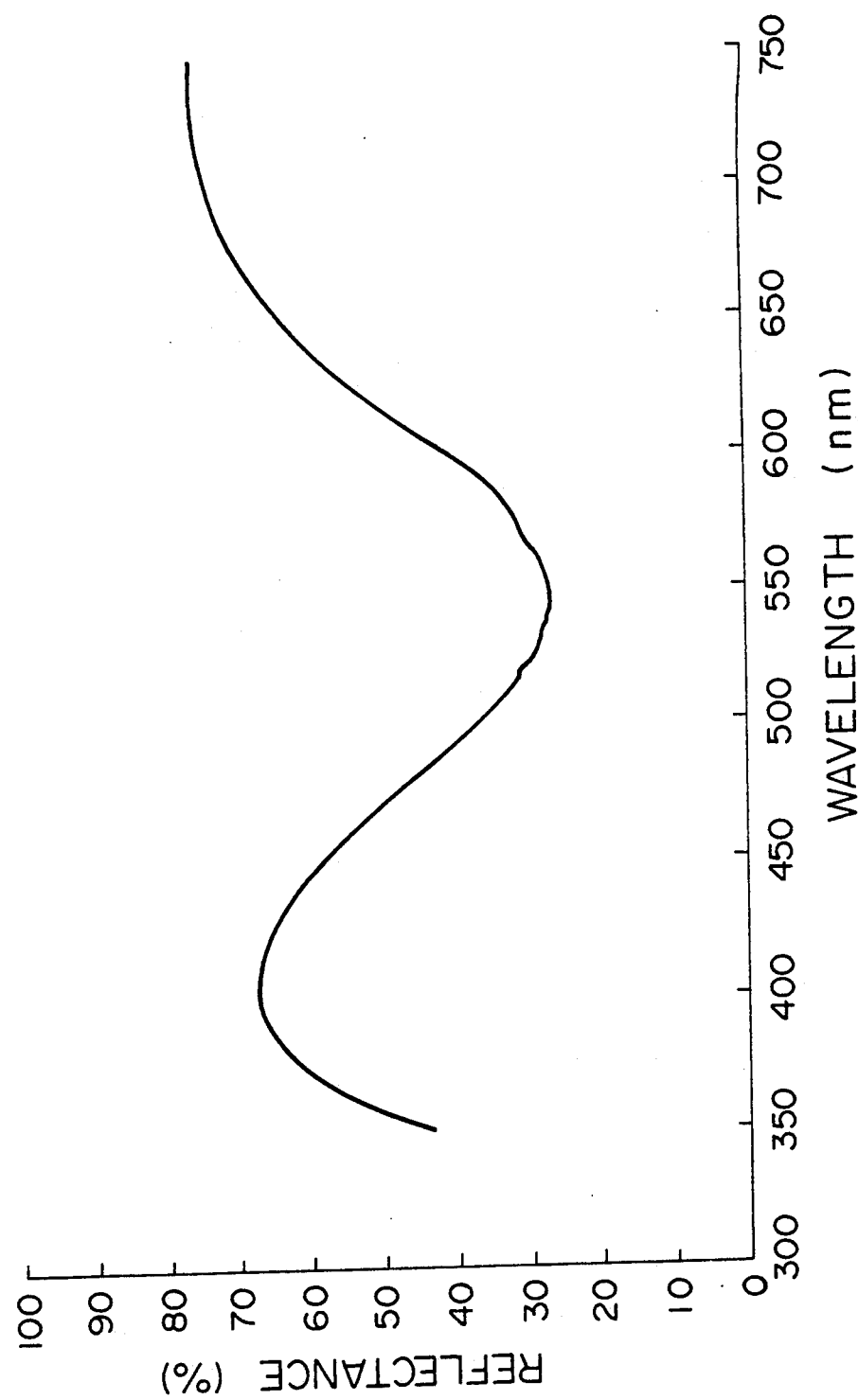

As is clear from FIG. 5, the multi-layered surface reflecting mirror of this Example shows a spectral reflection characteristic similar to that of the multi-layered surface reflecting mirror of Example 1 and accordingly is superior in freedom from glare and visibility.

Example 5

FIG. 1 (E) shows on an enlarged scale a sectional view of the essential part of another multi-layered surface reflecting mirror of the present invention. In FIG. 1 (E), numeral 41 is a glass substrate; numeral 42 is a Cr film; numeral 43 is a low refractive index material layer (a L layer) made of MgF$_2$ having a refractive index of 1.38, said layer having an optical thickness of $\lambda$o/4 (in this Example, $\lambda$o (the wavelength of a light used as the reference measurement for design purposes) is 540 nm and accordingly $\lambda$o/4 is 135 nm); numeral 44 is a high refractive index material layer (a H$_1$ layer) made of TiO$_2$ having a refractive index of 2.30, said layer having an optical thickness of $\lambda$o/4 (135 nm); and numeral 45 is another high refractive index material layer (a H$_2$ layer) made of ZrO$_2$ having a refractive index of 2.05, said layer having an optical thickness of $\lambda$o/4 (135 nm). That is, in the multi-layered surface reflecting mirror of this Example, there is formed, on one side of the glass substrate, a multi-layered film consisting of the Cr film, the L layer, the H$_1$ layer and the H$_2$ layer in this order, with the Cr film being closest to the substrate. A high refractive index film layer, i.e. a 2H layer having an optical thickness of $\lambda$o/2 is formed by the H$_1$ layer and the H$_2$ layer.

Figure 6:
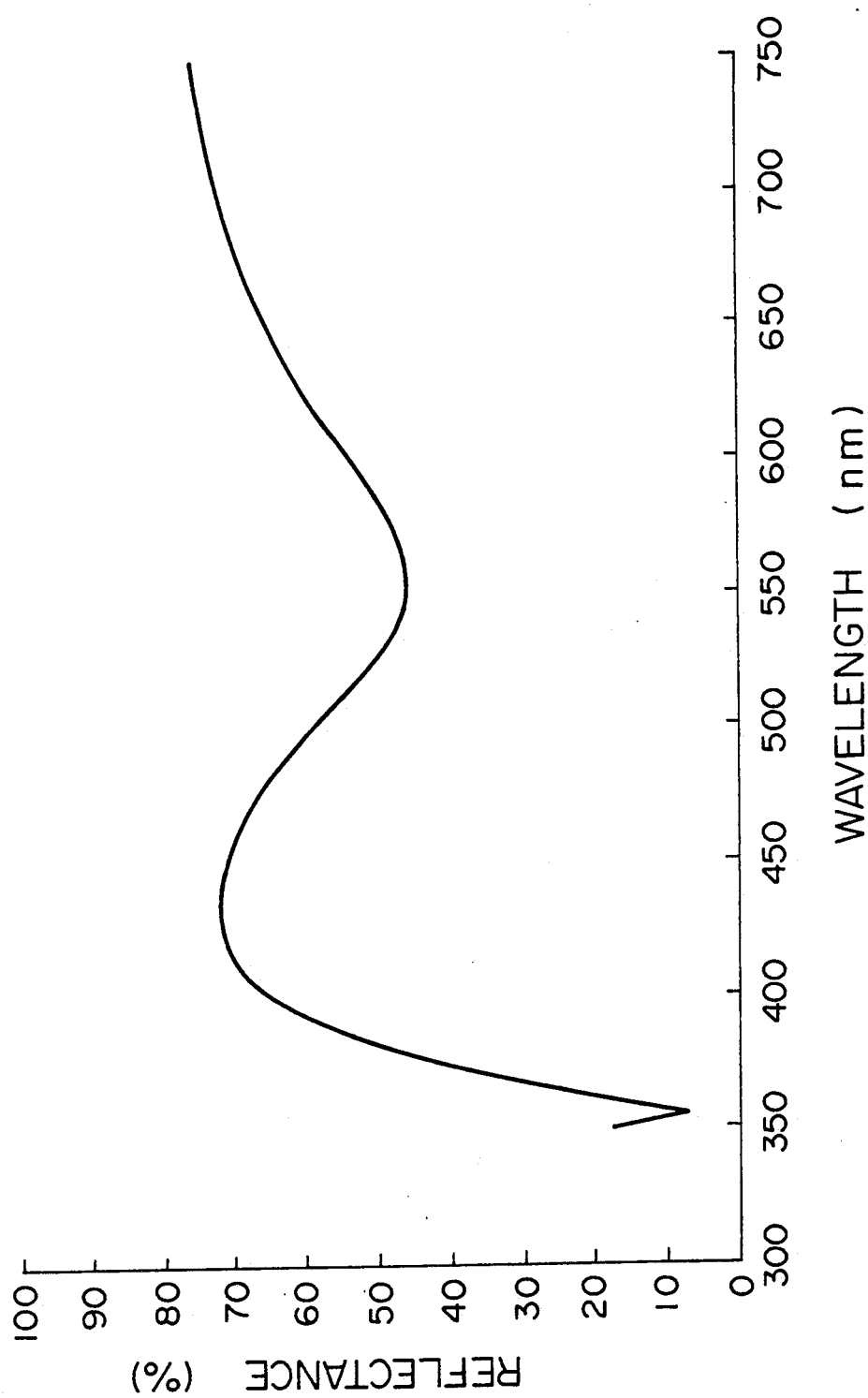

As is clear from FIG. 6, the multi-layered surface reflecting mirror of this Example shows a spectral reflection characteristic similar to that of the multi-layered surface reflecting mirror of Example 1 and accordingly is superior in freedom from glare and visibility.

Example 6

FIG. 1 (F) shows on an enlarged scale a sectional view of the essential part of another multi-layered surface reflecting mirror of the present invention. In FIG. 1 (F), numeral 51 is a glass substrate; numeral 52 is a Cr film; numeral 53 is a low refractive index material layer (a L/2 layer) made of MgF$_2$ having a refractive index of 1.38, said layer having an optical thickness of $\lambda$o/8 (in this Example, $\lambda$o (the wavelength of a light used as the reference measurement for design purposes) is 600 nm and accordingly $\lambda$o/8 is 75 nm); numeral 54 is a high refractive index material layer (a H$_1$ layer) made of TiO$_2$ having a refractive index of 2.30, said layer having an optical thickness of $\lambda$o/4 (150 nm); and numeral 55 is another high refractive index material layer (a H$_2$ layer) made of ZrO$_2$ having a refractive index of 2.05, said layer having an optical thickness of $\lambda$o/4 (150 nm). That is, in the multi-layered surface reflecting mirror of this Example, there is formed, on one side of the glass substrate, a multi-layered film consisting of the Cr film, the L/2 layer, the H$_1$ layer and the H$_2$ layer in this order, with the Cr film being closest to the substrate. A high refractive index film layer, i.e. a 2H layer having an optical thickness of $\lambda$o/2 is formed by the H$_1$ layer and the H$_2$ layer.

Figure 7:
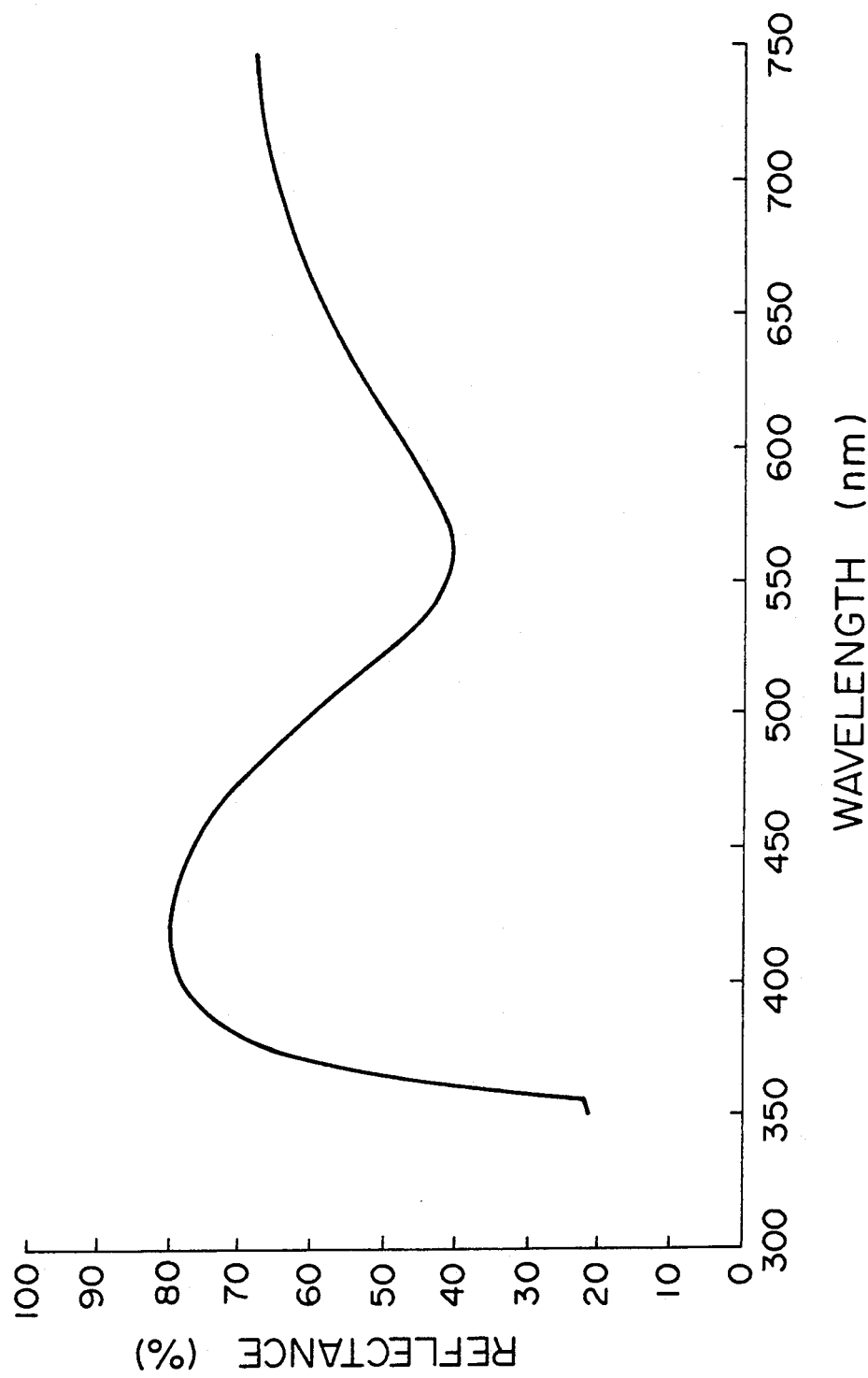

As is clear from FIG. 7, the multi-layered surface reflecting mirror of this Example shows a spectral reflection characteristic similar to that of the multi-layered surface reflecting mirror of Example 1 and accordingly is superior in freedom from glare and visibility.

In the above Examples 1-6, various multi-layered surface reflecting mirrors of the present invention have been explained. The same spectral reflection characteristic can be obtained when in each of Examples 1-4, a single layer consisting of the 2H layer is replaced with a double layer wherein a H$_1$ layer and a H$_2$ layer are formed in this order or a double layer wherein a H$_2$ layer and a H$_1$ layer are formed in this order. Also, the same spectral reflection characteristic can be obtained when in each of Examples 5 and 6, a double layer having the H$_1$ layer and the H$_2$ layer in this order is replaced with a double layer having the H$_2$ layer and the H$_1$ layer in this order (the order of the H$_1$ layer and the H$_2$ layer is reversed).

The same spectral reflection characteristic can be obtained also when in each of Examples 1-6, each layer of the dielectric multi-layered film is replaced with an equivalent film.

An equivalent spectral reflection characteristic can be obtained when the glass substrate is replaced with a plastic substrate.

Comparative Example

Figure 10:
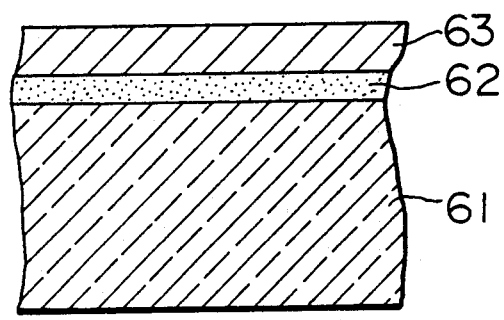
FIG. 10 shows on an enlarged scale the sectional view of the essential part of a multi-layered surface reflecting mirror of a comparative example.
Figure 11:
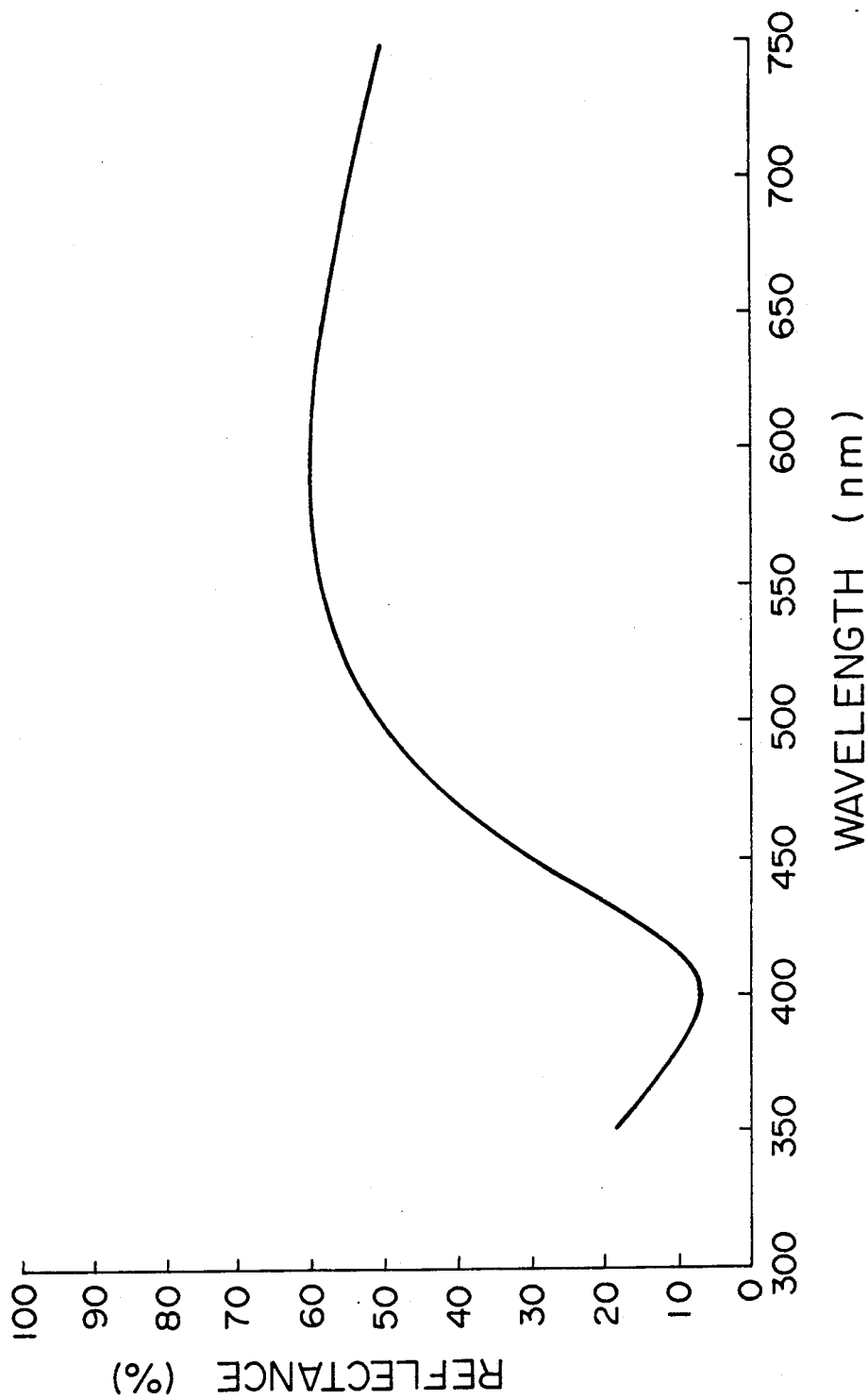
FIG. 11 shows the spectral reflection characteristic of the multi-layered surface reflecting mirror of a comparative example.

FIG. 10 shows on an enlarged scale the sectional view of the essential part of a multi-layered surface reflecting mirror for comparison which corresponds to the multi-layered surface reflecting mirror of Example 1, except that the low refractive index material layer (the L layer) is omitted. In FIG. 10, numeral 61 is a glass substrate; numeral 62 is a Cr film; and numeral 63 is a high refractive index material layer (a 2H layer) made of $ZrO_2$ having a refractive index of 2.05, said layer having an optical thickness of $\lambda_0/2$ (in this Comparative Example, $\lambda_0$ (the wavelength of a light used as the reference measurement for design purposes) is 540 nm and accordingly $\lambda_0/2$ is 270 nm). That is, in the multi-layered surface reflecting mirror of Comparative Example, there is formed, on one side of the glass substrate, a multi-layered film consisting of the Cr film and the 2H layer in this order, with the Cr film being closer to the substrate. The spectral reflection characteristic of this multi-layered surface reflecting mirror is shown in FIG. 11. FIG. 11 shows that unlike the surface reflecting mirrors of Examples 1–6, the surface reflecting mirror of this Comparative Example is inferior in freedom from glare because it has a high reflectance at a wavelength region of 480–550 nm where the product of the spectral luminous efficiency for dark adaptation of the human eye and the spectral energy characteristic of an automobile headlight is high, and is also inferior in visibility because it has a low reflectance at a 430–480 nm (blue) wavelength region (the brightness sensitivity of the human eye is low in blue (430–480 nm) and red (580–700 nm) wavelength regions).

Thus, it has been found from the above Examples and Comparative Example that in order to obtain a surface reflecting mirror having a glareless property and visibility, a dielectric film of single layer is insufficient and there is required a multi-layered dielectric film consisting of a low refractive index material layer having a given thickness as mentioned above and a high refractive index material layer having a given thickness as mentioned above.

The multi-layered surface reflecting mirror of the present invention has the following technical advantages.

(1) The mirror has a great degree of freedom from glare.

Figure 8:
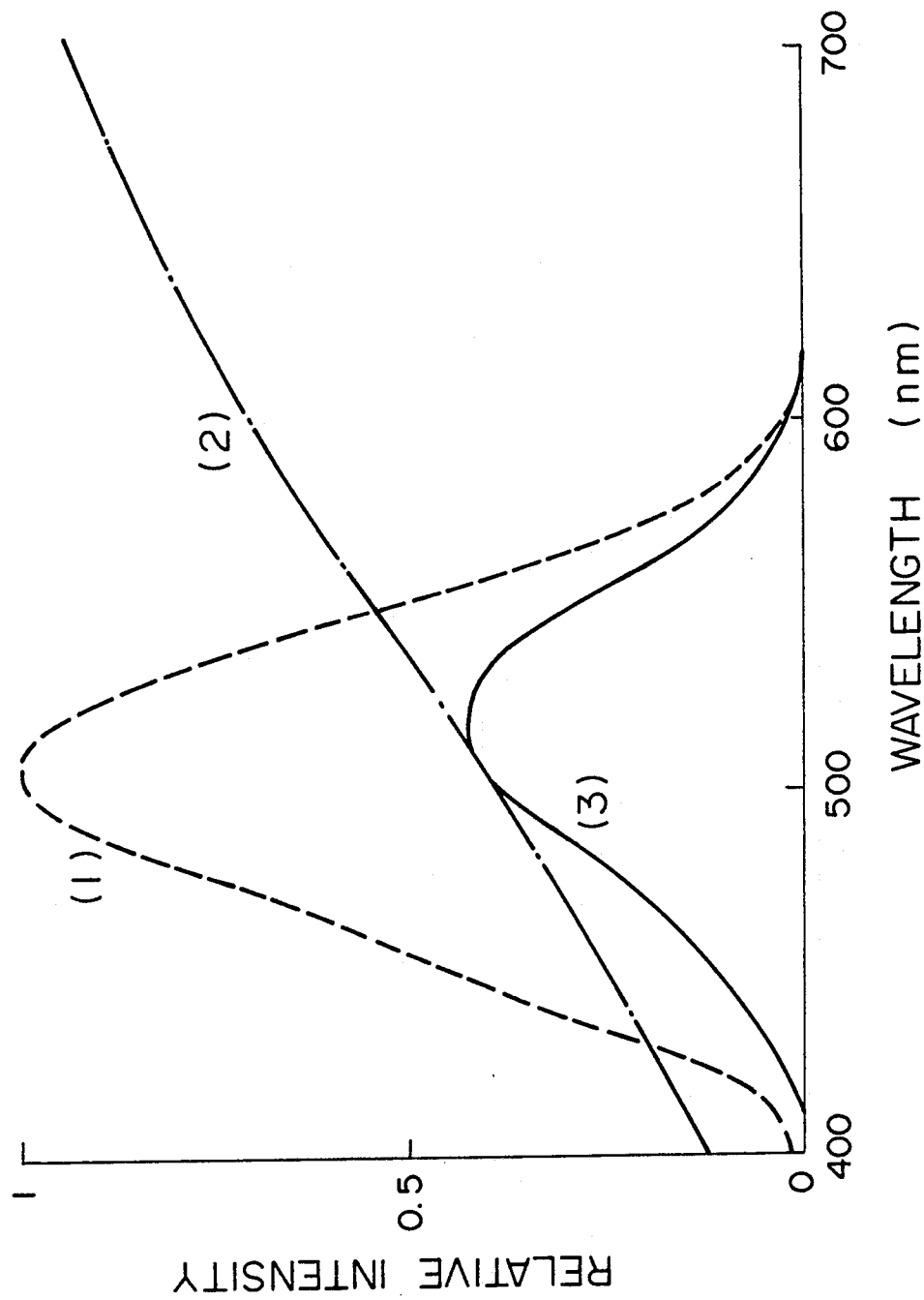
FIG. 8 shows the spectral luminous efficiency for dark adaptation of the human eye, the spectral energy characteirstic of an automobile headlight (halogen lamp), and the product of these two parameters, namely, the spectral energy characteristic of an automobile headlight as perceived by the human eye.
Figure 9:
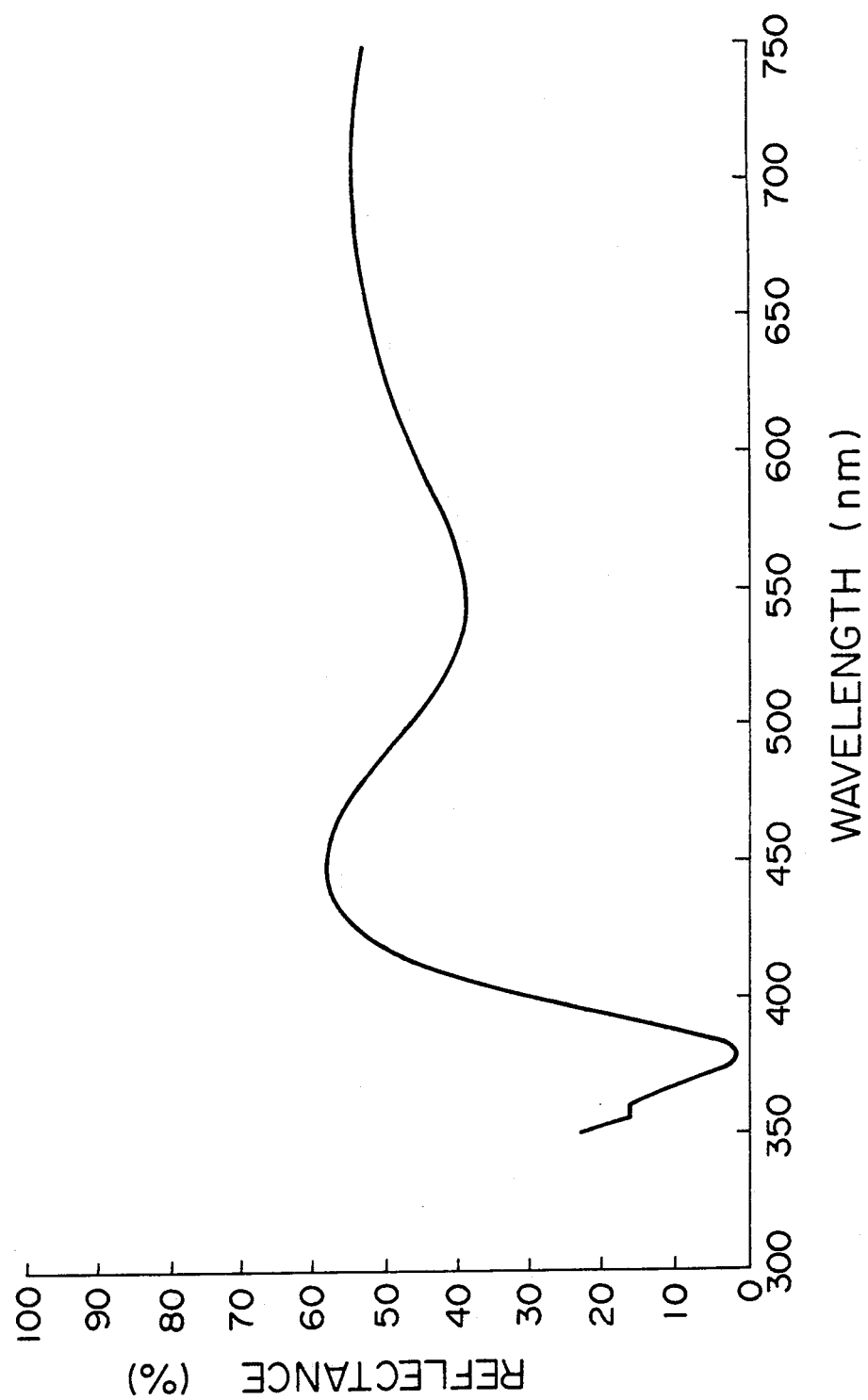
FIG. 9 shows the spectral reflection characteristic of the multi-layered surface reflecting mirror disclosed in Japanese Patent Application Kokai (Laid-Open) No. 165805/1988.

The reflecting mirror of the present invention has, as is clear from FIGS. 2–7, a low reflectance in a wavelength region of 480–580 nm which substantially agrees with 480–550 nm where the P $(\lambda) \times V'(\lambda)$ has a high value as seen in the curve (3) of FIG. 8. Accordingly, the reflecting mirror of the present invention has a great degree of freedom from glare.

(2) The mirror has a superior visibility.

As is shown in FIGS. 2–7, the reflecting mirror of the present invention has a low reflectance in a wavelength region where freedom from glare is required, and has a high reflectance in other wavelength regions. Therefore, a superior visibility is ensured in the reflecting mirror of the present invention.

The reflecting mirror of the present invention has an additional advantage of improved color distinguishability (improved color contrast) because the reflecting mirror is so designed that it has a lower reflectance in the green (490–580 nm) region (where a greater visual sensation occurs in terms of brightness) than in blue (400–480 nm) and red (590–750 nm) regions, thereby sensitizing these low-brightness colors.

(3) The mirror is superior in decorative and fashion aspects.

As a result of the aforementioned accomplishments in improving the degree of freedom from glare and the level of visibility, the reflecting mirror of the present invention produces a reflected light having a somewhat magenta hue. This magenta hue imparts a feeling of high quality to the mirror, thereby enabling the mirror of the present invention to be clearly differentiated from other reflecting mirrors on the market.

(4) The mirror is superior in productivity and cost.

The reflecting mirror of the present invention has such advantages in its production cost that the number of layers of the dielectric multi-layered film to be formed is small and moreover the dielectric multi-layered film and the metal or semiconductor film can be formed by the same method. Therefore, the reflecting mirror is superior in productivity and cost, unlike the reflecting mirror disclosed in Japanese Patent Application Kokai (Laid-Open) No. 165805/1988 wherein the number of layers of the dielectric multi-layered film to be formed is large and moreover there are required coating and baking in the formation of the light-absorbing film.

Thus, according to the present invention there is provided a multi-layered surface reflecting mirror having various advantages in freedom from glare, visibility, decorative aspect, elimination of deleterious light, etc. in spite of the small number of layers in the dielectric multi-layered film.

What is claimed is:

1. A multi-layered surface reflecting mirror comprising a substrate, a metal or semiconductor film formed on one side of the substrate and a dielectric multi-layered film formed on the metal or semiconductor film, said dielectric multi-layered film consisting of a low refractive index material layer having an optical thickness in the range of 0.05 $\lambda_0$ ($\lambda_0/20$)–0.4 $\lambda_0$ (2/5 $\lambda_0$), where $\lambda_0$ is the wavelength of a light used as the reference measurement for design purposes, and a high refractive index material layer having an optical thickness of $\lambda_0/2$, said low refractive index material layer being closer to the metal or semiconductor film relative to said high refractive index material layer, and said high refractive index material layer being closer to the atmosphere relative to said low refractive index material layer.

2. A multi-layered surface reflecting mirror according to claim 1, wherein the optical thickness of the low refractive index material layer is $\lambda_0/8$.

3. A multi-layered surface reflecting mirror according to claim 1, wherein the high refractive index material layer having an optical thickness of $\lambda_0/2$ is constituted by a high refractive index material layer having an optical thickness of $\lambda_0/4$ and another high refractive index material layer having an optical thickness of $\lambda_0/4$, said two high refractive index material layers being adjacent to each other.

4. A multi-layered surface reflecting mirror according to claim 1, wherein the low refractive index material layer is made of a low refractive index material having a refractive index in the range of 1.3–1.5.

5. A multi-layered surface reflecting mirror according to claim 4, wherein the low refractive index material is silicon oxide a metal fluoride or both.

6. A multi-layered surface reflecting mirror according to claim 1, wherein the high refractive index material layer is made of a high refractive index material having a refractive index in the range of 1.5–2.4.

7. A multi-layered surface reflecting mirror according to claim 6, wherein the high refractive index material is at least one member selected from the group consisting of a silicon or metal oxide, a metal fluoride and a metal sulfide.

8. A multi-layered surface reflecting mirror according to claim 1, wherein the substrate is made of glass or plastic.

9. A multi-layered surface reflecting mirror according to claim 1, wherein the metal or semiconductor film is made of at least one member selected from the group consisting of Cr, Ni, Al, Ag, Co, Fe, Si, Ge and an alloy containing at least one of the above mentioned metals, semiconductors or both.

10. A multi-layered surface reflecting mirror according to claim 1, wherein the optical thickness of the low refractive index material layer is $\lambda_0/4$.